(12) United States Patent
Puri

(10) Patent No.: US 7,229,831 B2
(45) Date of Patent: Jun. 12, 2007

(54) LEAK SITE ODORIZATION FOR GAS LEAK DETECTION

(75) Inventor: Pushpinder Singh Puri, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 666 days.

(21) Appl. No.: 10/321,311

(22) Filed: Dec. 16, 2002

(65) Prior Publication Data

US 2004/0115819 A1 Jun. 17, 2004

(51) Int. Cl.
G01N 33/24 (2006.01)
G01N 21/00 (2006.01)

(52) U.S. Cl. .......................... 436/30; 422/60
(58) Field of Classification Search ................ 422/60; 436/3, 30
See application file for complete search history.

(56) References Cited

U.S. PATENT DOCUMENTS

| | | | |
|---|---|---|---|
| 3,003,349 A | 10/1961 | Sullivan et al. | |
| 3,140,156 A | 7/1964 | Koh | |
| 3,634,053 A | 1/1972 | Klass et al. | |
| 5,335,373 A * | 8/1994 | Dangman et al. | ............ 2/161.7 |
| 5,695,089 A * | 12/1997 | Reese et al. | ........... 220/560.03 |
| 6,063,632 A | 5/2000 | Perkins | |
| 2004/0084083 A1* | 5/2004 | Pearson | ..................... 137/312 |

FOREIGN PATENT DOCUMENTS

JP 03035138 * 2/1991

OTHER PUBLICATIONS

Sandra Young, Gas and Liquid Diffusion in Membranes, Mar. 7, 2001, http://www.psrc.usm.edu/maurtiz/diffuse.html, p. 6.*

* cited by examiner

Primary Examiner—Jill Warden
Assistant Examiner—Lore Ramillano
(74) Attorney, Agent, or Firm—Keith D. Gourley

(57) ABSTRACT

An apparatus for detecting a leak of a fluid from a vessel having an inner wall and an outer wall includes: at least one odorant layer adjacent the inner wall or the outer wall; and at least one semi-permeable material layer adjacent the odorant layer.

16 Claims, 1 Drawing Sheet

LEAK SITE ODORIZATION FOR GAS LEAK DETECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to fluid leak detection, and in particular to the leak detection of gases by odor generated by adding odiferous materials to the gases at the leak site.

With the advent of the fuel cell technology and a drive for clean fuel, hydrogen gas is emerging as a leading candidate for the fuel of choice. In addition to the benefit of being oxidizable in an emission free manner, hydrogen may be obtained from an abundant, renewable, resource, water.

For hydrogen to become a consumer fuel for automobile and domestic power generation, safety is paramount. Although safe handling and use of hydrogen is well understood, warnings are needed to alert against any leaks. Hydrogen sensors are commercially available but are not considered to be an absolute safeguard against leaks due to their potential for malfunctioning, change of air currents, etc. Human senses, in particular, the sense of smell, are considered to be the ultimate safeguard against leaks. Since hydrogen is an odorless gas, odorants are preferably incorporated in hydrogen for easy leak detection. A review of the codes, standards, regulations, recommendations, and certifications on the safety of gaseous fuels is addressed in a report, Proc. U.S. DOE Hydrogen Program Rev. (1996), Vol. 2, pages 569-604.

Odorization of gases for leak detection is well known in the natural gas and petroleum gas industries. For example, a paper by M. J. Usher (*Proc. Int. Scho. Hydrocarbon Meas.* $73^{rd}$, pages 743-48 (1998)) reviews the history, application, compounds, and safety practices in selecting and applying odorants in the natural gas industry. Mixing small quantities of odorants with gases is a substantially universal practice in natural and petroleum gases. For example, a paper by I. Katuran (*Proc. Int. Sch. Hydrocarbon Meas.*, $64^{th}$, pages 325-30 (1989)) reports on natural gas odorants, their safety and handling precautions, handling techniques, and methods of adding odorants to gases.

Nearly all of the methods for odorization of natural and petroleum gases consist of metering a certain amount of the odorant into a gas stream to a level where detection can be made by the human sense of smell. Natural gas for public gas supplies typically contains 5-10 mg of sulfur per cubic meter of gas. However, odorants for hydrogen used as an energy source for fuel cells have unique requirements which must be met. This is because most of the commercial odorants used in gas leak detection act as poisons for the catalysts used in hydrogen based fuel cells, most specifically for the PEM (polymer electrolyte membrane or proton exchange membrane) fuel cells. Chemical compounds based on mixtures of acrylic acid and nitrogen compounds have been adopted to achieve a sulfur-free odorization of a gas. See, for example, WO 00/11120 (PCT/EP99/05639) by Haarmann & Reimer GmbH. However, these formulations are either ineffective or do not have general acceptance by users. Also, in the use of natural gas and other petroleum gases for hydrogen generation for fuel cell applications, sulfur free natural or petroleum gases are needed, or else a desulfurization step must be incorporated in the reforming process, which adds further cost to hydrogen generation.

The PEM fuel cells are sulfur intolerant because sulfur compounds poison the noble metal catalysts used in these fuel cells. If sulfur-containing odorants are used, it would be necessary to remove sulfur containing materials, like mercaptan odorants, from the feed gas using materials like zinc oxide. The sulfur containing materials, like thiophenes, cannot be removed by zinc oxide and may require a hydrodesulfurization process, using hydrogen gas, to remove sulfur. This all will add to the cost of the process.

A further complexity for hydrogen fuel comes from the nature of the hydrogen flame propagation. When gases burn in air, their flames propagate upwards with greater ease than they propagate downwards. This is primarily due to the natural convection of hot burnt gases in an upward direction. For petroleum gases, propane and methane, the upward and downward propagating lean limits of combustion are approximately the same. However, for hydrogen, since they differ by a factor of 2.5, the amount of odorant needed for leak detection in hydrogen could be >2.5 times that needed for methane or propane. The higher quantity of the odorant needed for hydrogen odor detection further complicates the sulfur poisoning problems for hydrogen gas used in the PEM fuel cells.

In several other gas applications, particularly when gases are odorless, toxic, or are otherwise harmful, methods of leak detection using odiferous materials are also desirable. The gases included in this category are, for example, nitrogen, carbon monoxide, nitrogen trifluoride, ethylene oxide, carbon tetrafluoride and other perfluoro gases.

Several other issues also have been encountered in the odorization of the natural and petroleum gases. The key ones are (1) hydrocarbon masking the odor of the odiferous materials, (2) adsorption of the odorant on the storage vessel and pipe walls, (3) reaction of the odorants with low molecular weight mercaptans (naturally occurring in the gas), (4) condensation of the odorants in the gas storage vessel and pipes, and (5) physical scrubbing of the mercaptans from the gas with liquids (associated with the natural gas).

Today, approximately twenty-five different blends are used as natural gas odorants. Of these twenty-five blends, seven blends are more prevalent. Almost all of the odorant agents are sulfur compounds, e.g., mercaptans (tert-butyl mercaptan, isopropyl mercaptan, normal propyl mercaptan, secondary butyl mercaptans, ethyl mercaptans, normal butyl mercaptan, etc.), thiophenes (tetrahydrothiophene), sulfides (dimethyl sulfide, methyl ethyl sulfide), etc.

In addition to the pungent odors of these chemicals, the chemicals used are also expected to have certain other attributes, such as low vapor pressure (high boiling point), low freezing point, low specific gravity so that they are fully dispersed in the gas, and appropriate thermal properties (e.g., they will not freeze at appropriate temperatures and will not cause over odorization in the hot weather). The general quality requirements, as specified for sulfur containing odorants in ISO/DIS 13734, are: (1) a cloud point of less than −30 degrees Celsius, (2) a boiling point of less than 130 degrees Celsius, and (3) evaporation residue of less than 0.2%.

Requirements for odorants further will likely include an odorant concentration high enough to allow detection with a fuel gas concentration of ⅕ the lean limit of combustion.

These requirements exist for natural gas (SAE J 1616, NFPA 52-1992) and petroleum gas (NFPA 58-1989).

It is, therefore, desired to have a method and system for the use of odorants in gas storage and delivery systems in which the above stated problems are alleviated.

It is further desired to have a method and system for the use of odorants in gas storage and delivery systems in which the odorants are not dispersed in the bulk gas but are accessible only to the leaking gas streams, thus alleviating the above said concerns and making leak detection by smell viable without adding odorants in the entire gas stream.

It is still further desired to have a system and method for the use of odorants in gas storage and delivery systems which can be used for gas leak detection with the use of an odorant(s), where the odorant(s) do not contaminate the bulk gas stream.

It is also desired to have such a system and method which overcomes the difficulties and disadvantages of the prior art to provide better and more advantageous results.

BRIEF SUMMARY OF THE INVENTION

The present invention is an apparatus and method for detecting a leak of a fluid from a vessel. Typically, the fluid leaking from the vessel is leaking to a surrounding atmosphere. There are several embodiments of the apparatus and the method, as discussed below. In a number of the embodiments, the fluid is a pressurized gas.

With regard to the apparatus of the present invention, a first embodiment is an apparatus for detecting a leak of a fluid from a vessel having an inner wall and an outer wall. The apparatus includes at least one odorant layer adjacent the inner wall or the outer wall, and at least one semi-permeable material layer adjacent the odorant layer.

There are a number of variations of this first embodiment of the apparatus. In one variation, the odorant layer is adjacent the; outer wall and is disposed between the outer wall and the semi-permeable layer. In another variation, the odorant layer is adjacent the inner wall and is disposed between the inner wall and the semi-permeable material layer.

In another variation, the fluid is hydrogen. In yet another variation, at least a portion of the fluid is a gas stored and/or transported in the vessel. In variant of that variation, at least a portion of the gas is at or above an ambient pressure.

In another variation of the first embodiment, at least a portion of the odorant layer contains at least one odorant material containing at least one odor detectable by a sense of smell of living being. In yet another variation, a flow of the fluid is transmitted through both the semi-permeable material layer and the odorant layer, at least a portion of the odorant layer containing at least one odorant material having at least one detectable odor, whereby the flow of the fluid picks up and transmits a portion of the odorant material into a surrounding atmosphere. In a variant of that variation, the detectable odor is detectable by a sense of smell of a living being.

In another variation of the first embodiment, at least a portion of the odorant layer is supported on an inert substrate. In yet another variation, at least one odorant material is encapsulated in at least one medium in or on at least a portion of the odorant layer.

In another variation of the first embodiment, at least a portion of the odorant layer contains at least one odorant material selected from a group consisting of mercaptans (tert-butyl mercaptan, isopropyl mercaptan, normal propyl mercaptan, secondary butyl mercaptans, ethyl mercaptans, normal butyl mercaptan), thiophenes (tetrahydrothiophene), sulfides (dimethyl sulfide, methyl ethyl sulfide), and combinations thereof, and odorants selected from a group consisting of derivatives of acrylic acid, alkyl ethers of $C_4$-$C_7$, carboxylic acids, and combinations thereof. In yet another variation, at least a portion of the semi-permeable material layer is a polymer selected from a group consisting of a rubbery polymer, a glassy polymer, and combinations thereof, the rubbery polymer being selected from a group consisting of polydimethyl siloxanes, polyphosphazenes, and combinations thereof, and the glassy polymer being selected from a group consisting of polyimides, polysulfones, polyamides, polyarylates, polyolefins, polyetherketones, polycarbonates, and combinations thereof.

Another embodiment of the apparatus of the present invention is an apparatus for detecting a leak of a fluid from a vessel having an inner wall and an outer wall, which apparatus includes four elements. The first element is a first odorant layer adjacent the inner wall. The second element is a first semi-permeable material layer adjacent the first odorant layer, the first odorant layer being disposed between the wall and the first semi-permeable material layer. The third element is a second odorant layer adjacent the outer wall. The fourth element is a second semi-permeable material layer adjacent the second odorant layer, the second odorant layer being disposed between the outer wall and the second semi-permeable material layer.

There are several other embodiments of the apparatus of the present invention. One such embodiment is an apparatus for detecting a leak of a fluid from a vessel having a wall. The apparatus includes at least one semi-permeable material layer adjacent the wall, and at least one odorant layer disposed between the wall and the semi-permeable material layer.

Another embodiment is an apparatus for detecting a leak of a pressurized gas from a storage vessel to a surrounding atmosphere, the vessel having an inner wall and an outer wall. The apparatus includes two elements. The first element is at least one odorant layer adjacent the inner wall or the outer wall, at least a portion of the odorant layer containing at least one odorant material having at least one odor detectable by a sense of smell of a human. The second element is at least one semi-permeable material layer adjacent the odorant layer, at least a portion of the semi-permeable material layer being permeable by the gas but not by the odorant material. In this embodiment, a flow of the gas leaking from the vessel passes through both the semi-permeable material layer and the odorant layer, and the flow of the gas thereby picks up and transmits to the surrounding atmosphere a portion of the odorant material having at least one odor detectable by a sense of smell of the human.

Another embodiment is an apparatus for detecting a leak of a pressurized gas from a storage vessel to a surrounding atmosphere, the vessel having a wall. This embodiment also has two elements. The first element is at least one semi-permeable material layer adjacent the wall, at least a portion of the semi-permeable material layer being permeable by the gas. The second element is at least one odorant layer disposed between the wall and the semi-permeable material layer, at least a portion of the odorant layer containing at least one odor detectable by a sense of smell of a human, wherein the semi-permeable material layer is not permeable by the odorant material. In this embodiment, a flow of the gas leaking from the vessel passes through both the semi-permeable material layer and the odorant layer, and the flow of the gas thereby picks up and transmits to the surrounding atmosphere a portion of the odorant material having at least one odor detectable by a sense of smell of the human.

Another aspect of the present invention is a vessel having an apparatus as in any one of the above-described embodiments or in any one of the variations or variants thereof.

With regard to the method of the present invention, there also are several embodiments. The first embodiment is a method for detecting a flow of a fluid leaking from a vessel to a surrounding atmosphere, the vessel having an inner wall and an outer wall. The method includes multiple steps. The first step is to provide at least one odorant layer adjacent the inner wall or the outer wall, at least a portion of the odorant layer containing at least one odorant material having at least one detectable odor. The second step is to provide at least one semi-permeable material layer adjacent the odorant layer, at least a portion of the semi-permeable material layer being permeable by the fluid but not by the odorant material. The third step is to transmit the flow of the fluid through both the odorant layer and the semi-permeable material layer, whereby the flow of the fluid picks up and transmits a portion of the odorant material into the surrounding atmosphere. The fourth step is to detect the detectable odor in the surrounding atmosphere.

There are several variations of the first embodiment of the method. In one variation, the fluid is hydrogen. In another variation, the detectable odor is detectable by a sense of smell of a living being. In yet another variation, at least a portion of the fluid is a gas stored and/or transported in the vessel. In a variant of that variation, at least a portion of the gas is at or above an ambient pressure.

In another variation of the method, at least a portion of the odorant layer contains at least one odorant material selected from a group consisting of mercaptans (tert-butyl mercaptan, isopropyl mercaptan, normal propyl mercaptan, secondary butyl mercaptans, ethyl mercaptans, normal butyl mercaptan), thiophenes (tetrahydrothiophene), sulfides (dimethyl sulfide, methyl ethyl sulfide), and combinations thereof, and odorants selected from a group consisting of derivatives of acrylic acid, alkyl ethers of $C_4$-$C_7$, carboxylic acids, and combinations thereof. In another variation, at least a portion of the semi-permeable material layer is a polymer selected from a group consisting of a rubbery polymer, a glassy polymer, and combinations thereof, the rubbery polymer being selected from a group consisting of polydimethyl siloxanes, polyphosphazenes, and combinations thereof, and the glassy polymer being selected from a group consisting of polyimides, polysulfones, polyamides, polyarylates, polyolefins, polyetherketones, polycarbonates, and combinations thereof.

There also are several other embodiments of the method of the present invention. For example, another embodiment is a method for detecting a flow of a fluid leaking from a vessel to a surrounding atmosphere, the vessel having a wall. The method includes multiple steps. The first step is to provide at least one semi-permeable material layer adjacent the wall, at least a portion of the semi-permeable material layer being permeable by the fluid. The second step is to provide at least one odorant layer disposed between the wall and the semi-permeable material layer, at least a portion of the odorant layer containing at least one odorant material having at least one detectable odor, wherein the semi-permeable material layer is not permeable by the odorant material. The third step is to transmit a flow of the fluid through both the odorant layer and the semi-permeable material layer, whereby the flow of the fluid picks up and transmits a portion of the odorant material into the surrounding atmosphere. The fourth step is to detect the detectable odor in the surrounding atmosphere.

Another embodiment is a method for detecting a flow of a pressurized gas leaking from a storage vessel to a surrounding atmosphere, the vessel having an inner wall and an outer wall. The method includes multiple steps. The first step is to provide at least one odorant layer adjacent the inner wall or the outer wall, at least a portion of the odorant layer containing at least one odorant material having at least one detectable odor detectable by a sense of smell of human. The second step is to provide at least one semi-permeable material layer adjacent the odorant layer, at least a portion of the semi-permeable material layer being permeable by the gas but not by the odorant material. The third step is to transmit the flow of the gas through both the odorant layer and the semi-permeable material layer, whereby the flow of the gas picks up and transmits a portion of the odorant material into the surrounding atmosphere. The fourth step is to detect by the sense of smell of the human the detectable odor in the surrounding atmosphere.

Yet another embodiment is a method for detecting a flow of a pressurized gas leaking from a storage vessel to a surrounding atmosphere, the vessel having a wall. The method includes multiple steps. The first is to provide at least one semi-permeable layer adjacent the wall, at least a portion of the semi-permeable material layer being permeable by the gas. The second step is to provide at least one odorant layer disposed between the wall and the semi-permeable material layer, at least a portion of the odorant layer containing at least one odorant material having at least one detectable odor detectable by a sense of smell of a human, wherein the semi-permeable material layer is not permeable by the odorant material. The third step is to transmit the flow of the gas through both the odorant layer and the semi-permeable material layer, whereby the flow of the gas picks up and transmits a portion of the odorant material into the surrounding atmosphere. The fourth step is to detect by the sense of smell of the human the detectable odor in the surrounding atmosphere.

Persons skilled in the art will recognize that one or more additional semi-permeable materials or permeable material layers could be placed in between the vessel wall and the odorant layer and/or in between the odorant layer and the semi-permeable material layer employed in the present invention, as described in the embodiments above. Such arrangements would still function in accordance with the present invention as long as the additional semi-permeable or permeable materials are permeable to the stored gas and/or to at least a portion of the odorant material from the odorant material layer, as appropriate. The additional semi-permeable or permeable material in such an arrangement could be in any of the following forms: solid, liquid, gaseous, or multiphase.

In view of the above, the term "adjacent" as used herein means next to, nearby, or in close proximity, but also covers situations where one or more additional semipermeable or permeable materials are positioned in between the odorant layer and the vessel wall and/or in between the odorant layer and the semi-permeable material layer utilized in the present invention. In such situations, if the additional semi-permeable or permeable materials are permeable to at least a portion of the odorant material, then the odorant material layer is considered to be "adjacent" the vessel wall, or "adjacent" the semi-permeable material layer utilized in the present invention, despite the fact that there are one or more intervening or intermediate additional materials.

BRIEF DESCRIPTION OF SEVERAL VIEWS OF THE DRAWINGS

This invention will now be described by way of example with reference to the accompanying drawings in which.

DETAILED DESCRIPTION OF THE INVENTION

Figure 1:
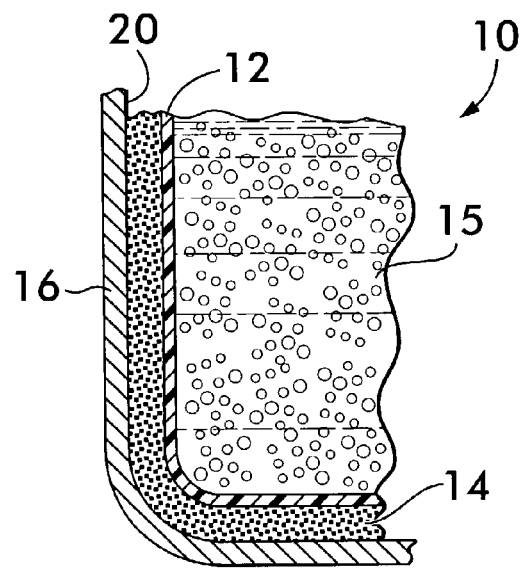
FIG. 1 is a simplified, partial, cross-sectional view of a vessel in accordance with one embodiment of the present invention.

A novel system and method for leak detection for non-odorous, flammable and toxic gases are provided in which odorants are not mixed in the bulk gas but are placed in the path of the gas leak. The odorants are encapsulated between an appropriate semi-permeable material layer and the walls of the gas storage vessels and piping. For purposes of the present invention, the term "vessel" is intended to include any vessel, piping, or piping system capable of containing a pressurized gas.

The properties of the semi-permeable material layer are such that it permits the transport of the stored gases into the encapsulated space where the odorants are placed, but does not permit the transport of the odoriferous substances into the bulk gas or the surrounding atmosphere. The odorants may be encapsulated by coating them onto the interior and/or exterior surfaces of the vessels over which a coating (e.g., a layer) of a semi-permeable material is placed. Odorants also may be encapsulated in between two layers of the semi-permeable materials of similar or different gas transport properties.

In the event of a gas leak from a vessel, gas will travel from the bulk storage area within the vessel to the gas leak spot due to the gas pressure gradient. For the leaking gas to travel from the bulk storage area to the leak spot, it must permeate through the semi-permeable material layer and pass through the encapsulated odorants. As the gas passes thought the odorants, the gas carries with it the odorant materials and releases a mixture of the gas and odorant materials from the leak spot. The gas leak, therefore, may be detected by the smell of the odorant. Thus, a gas leak may be detected without contaminating the bulk gas supply. The odorant material volatility is such that it has a certain vapor pressure at the storage temperature and it diffuses into the leaking gas to impart to it a detectable amount of the odorant. Alternatively, the odorants can be physically carried (entrained) by the high pressure leaking gas to impart a detectable amount of odorant in the gas. Both of these mechanisms may prevail at any given time during the leak of the gas from the vessel.

The semi-permeable material layer encapsulating the odorant may be coated on the interior surface, the exterior surface, or both the interior and exterior surfaces of the gas storage vessel, the piping and appurtenances. For purposes of the present invention, the term "appurtenance" is intended to include fittings, valves, meters, and any other devices or objects attached to the vessel and piping which include part of the total gas storage space. The encapsulation of the odorant materials in the semi-permeable layer may be accomplished by any of several methods known to those skilled in the art of encapsulation. Several of these methods are given below as examples. The application of the odorant encapsulated semi-permeable layer on the interior surface, the exterior surface, or both the interior and exterior surfaces of the gas storage vessel, piping and appurtenances may be done by a variety of methods also given in the examples.

Referring now to the drawings, FIG. 1 shows a simplified portion of a cross section of a vessel 10 in accordance with one embodiment of the present invention. The vessel 10 has a vessel wall 16 having an inner wall 20 where an odorant layer 14 is located. The odorant layer 14 fully covers the entire interior of the vessel 10. A semi-permeable material layer 12 is located over the odorant layer 14 on the inner wall of the vessel 10 to fully cover the odorant layer 14. The semi-permeable material layer 12, for example, a polymer film, encapsulates the odorant layer 14, which preferably is in the form of a liquid or semi-solid film.

Figure 2:
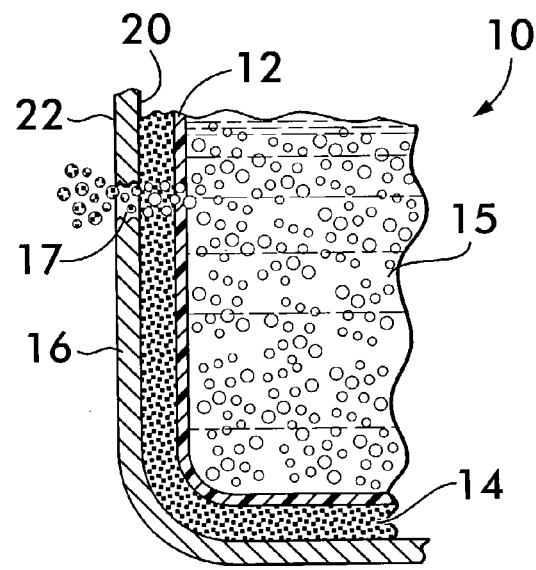
FIG. 2 is a simplified, partial, enlarged, cross-sectional view of the vessel of FIG. 1 showing a leak point of gas through the vessel wall.

As illustrated in FIG. 2, when a leak develops in the vessel 10, stored gas 15 rushes through the leak site orifice 17 from inner wall 20, i.e., the high-pressure side of the vessel wall 16, to the outer wall 22, i.e., the low-pressure side of the vessel 10. Since the leaking gas 15 has to permeate through the semi-permeable material layer 12 and then through the odorant layer 14, the leaking gas carries with it an appropriate amount (e.g., about 1-10 mg S/cubic meter gas or more) of the odorant material from the odorant layer 14, thus imparting an odor in the leaking gas.

Figure 3:
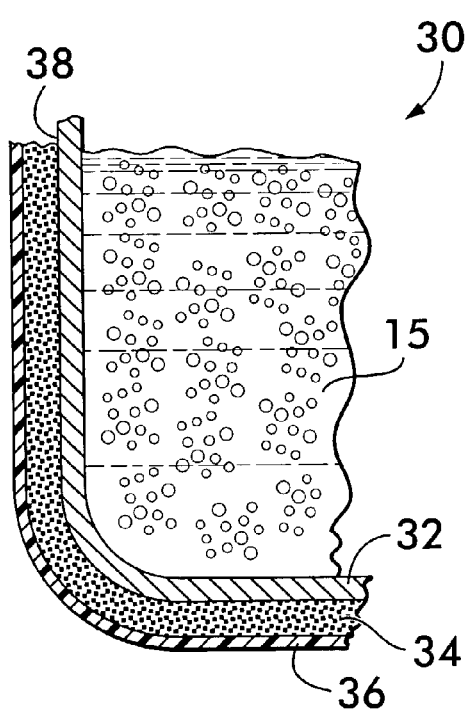
FIG. 3 is a simplified, partial, cross-sectional view of a vessel in accordance with another embodiment of the present invention.

FIG. 3 illustrates a simplified portion of a cross section of a vessel 30 in accordance with another embodiment of the present invention. The vessel 30 has a vessel wall 32 or walls. However, in this embodiment, the odorant layer 34 is coated on the outer wall 38 of the vessel wall 32 such that the entire outer surface of the vessel 30 and any appurtenances are completely covered with the odorant layer 34. The semipermeable material layer 36 completely covers the odorant layer 34. Since the gas leaking from vessel wall 32 has to permeate through the odorant layer 34 before the gas reaches the semi-permeable material layer 36, the leaking gas carries with it an appropriate amount (e.g., about 1-10 mg S/cubic meter gas or more) of the odorant material from the odorant layer 34, thus imparting an odor in the leaking gas. The pressure of the leaking gas may cause a rupture in the semi-permeable material layer 36 to leak the gas and the odorant mixture.

Figure 4:
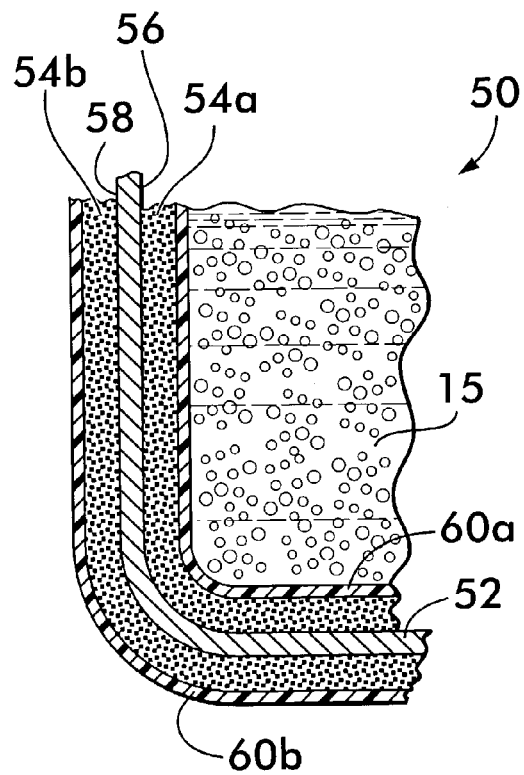
FIG. 4 is a simplified, partial, cross-sectional view of a vessel in accordance with yet another embodiment of the present invention.

FIG. 4 illustrates a simplified portion of a cross section of a vessel 50 in accordance with another embodiment of the present invention. This embodiment combines the benefits of the two embodiments illustrated in FIG. 1 and FIG. 3. The vessel 50 has a vessel wall 52 or walls. A first odorant layer 54a and a second odorant layer 54b are coated on the inner wall 56 and the outer wall 58 respectively to fully coat the inner wall 56 and the outer wall 58, including any appurtenances. A first semi-permeable material layer 60a is located over the first odorant layer 54a and a second semi-permeable material layer 60b is located over the second odorant layer 54b to fully encapsulate the odorant layers (54a, 54b). The leaking gas has to permeate through the first semi-permeable material layer 60a, the first odorant layer 54a, the vessel wall 52, and then through the second odorant layer 54b and the second semi-permeable material layer 60b. The leaking gas carries with it an appropriate amount (e.g., about 1-10 mg S/cubic meter gas or more) of the odorant material from the odorant layers (54a, 54b), thus imparting an odor in the leaking gas.

The invention will be illustrated in more detail with reference to the following Examples, but it should be understood that the present invention is not limited thereto.

EXAMPLES

Example 1

A solution of the odoriferous materials in appropriate solvent is prepared in a concentration of 0.01% to 99.99% w/w. The odoriferous materials used are: mercaptans (tert-butyl) mercaptan, isopropyl mercaptan, normal propyl mercaptan, secondary butyl mercaptans, ethyl mercaptans, normal butyl mercaptan, etc.), thiophenes (tetrahydrothiophene), sulfides (dimethyl sulfide, methyl ethyl sulfide), and the like, and combinations thereof, and odorants selected from a group consisting of derivatives of acrylic acid, alkyl ethers of $C_4$-$C_7$, carboxylic acids, and combinations thereof. The solvents used are polar or non-polar or mixtures thereof, depending on the nature of the odorant selected. The nature of the solvent is such that it dissolves the odorants, has a relatively high volatility, wets the surfaces over which it is coated and is capable of forming a continuous thin film of liquid or semi-solid odorant solution on the vessel surfaces. A thin film of the coating solution is made on the surface of the vessel by contacting the coating solution to the surfaces and drying out the solvents, such that a continuous layer of the odorant is left on the surfaces. A single or multiple coating of the odorant solution is done on the surface to create an odorant layer which covers almost all of the desired surface. The odorant layer is then subsequently encapsulated by coating over it a single or multiple continuous layer of a semi-permeable or microporous polymeric or non-polymeric material layer which has characteristics such that it permits the transport of the gas through it but does not permit permeation of the odorant. The material used to form an encapsulating layer over the odorant film, for example, is made using a rubbery polymer such as polydimethyl siloxane amongst other rubbery materials and glassy polymers such as polyimides, polysulfones, polyamides, polyarylates, polyolefins, polycarbonates and the like.

The encapsulating coating on the vessel surfaces and on the appurtenance surfaces may be accomplished by several methods. The art of forming polymeric semipermeable membranes and microporous membranes is well documented in textbooks, for example, in R. E. Kesting and A. K. Fritzsche, *Polymeric Gas Separation Membranes*, Wiley (1983) and in R. E. Kesting, *Synthetic Polymer Membranes*, Wiley (1985). The art of making microporous inorganic membranes is well documented, for example, in C. J. Brinker and G. W. Scherer, *Sol-Gel Science*, Academic Press (1990). In one simple method, the coating solution is filled in the vessel and its appurtenances. The coating solution is then drained and the surfaces are dried by volatilization of the solvents, either by natural evaporation or by forced evaporation caused by heating the surfaces, using air or inert gas circulation or the combination thereof. The nature of the solvent used in these coatings is such that it does not dissolve the odorant coating that is already on the surface. Alternatively, a spray coating method or other methods known to those skilled in the coating art can do the coatings. Pre-prepared semi-permeable material layers in the form of membranes may also be placed on the odorant layer to encapsulate the odorant layer. Such semi-permeable membranes can either be commercially purchased or fabricated separately using the known art described, for example, in the references cited herein.

In some cases, to block the defects in the original coating, an over coating is then made by dissolving a rubbery or glassy film forming polymer in an appropriate volatile solvent at a concentration ranging from 0.1% to 10% w/w solution depending on the thickness of the coating needed. The nature of the solvent used for these coatings is such that it does not dissolve the odorant coating that is already on the surface. Single layer or multiple coatings are made to assure that the odorant layer is fully encapsulated between the surface of the vessel and the coating polymer.

Example 2

The odoriferous material in Example 1 is mixed with an appropriate polymer to make a coating solution capable of forming a film on the surface of the vessel and its appurtenances. A 0.01-10% w/w solution of a water soluble polymer coating material from the family of polyacrylic acid, polyvinyl acetate, poly vinyl alcohols, etc. is mixed with 0.01-100% w/w of the odoriferous materials solution to form the odoriferous coating solution. A single layer or multi-layer coating of this material is applied to the walls of the gas vessel. The odorant/polymer coating is then encapsulated by making an additional layer of rubbery or glassy polymers over it as described in Example 1.

Example 3

The first coating of the odoriferous material in Example 1 is made in an appropriate polymer coating material that is capable of forming a film on the surface of the vessel and accessories. A 0.01-10% w/w solution of a non-aqueous solvent coating material, from the family of polydimethyl siloxanes, polyphasphazenes, and the like, is mixed with 0.01-100% w/w of the odoriferous materials and the appropriate surfaces are coated with them. A single layer or multi-layer coating of this material is applied to the walls of the gas vessel. The odorant/polymer coating is then encapsulated by making an additional layer of rubbery or glassy polymers as taught in Example 1.

Example 4

The coating described in Example 3 is cross linked by using cross linking agents in the coating solution and/or using external means, e.g., heat, irradiation, and the like, to cross link the coating. A cross linked coating may be structurally stronger and less prone to the attack of the solvents than a non-cross linked coating. The art of making coatings of the rubbery materials and their cross-linking is taught by J. H. Henis and M. K. Tripodi in U.S. Pat. No. 4,230,463 and described in a paper published in the *Journal of Membrane Science*, 8, 233 (1981).

Example 5

The coating described in Example 4 is encapsulated in a polymer layer as given in Example 1 but is cross linked using similar cross linking methods as used in Example 4.

Example 6

The coatings in Examples 1 to 5 are a mix of individual polymer layers of cross linked and uncross linked polymers in several possible manners.

Example 7

The coatings made in Examples 1 to 6 where the initial layer (in contact with the vessel or appurtenances surfaces) and the final layer (in contact with the gas, when the vessel is filled) coatings do not contain odorant materials. The odorant is sandwiched between the two coating layers. These coatings are made in a similar manner as described in Example 1.

Example 8

The coatings in Example 7 are made using a glassy polymer such as polysulfone, polyamide, polyimide, polyarylate and other appropriate polymers.

Example 9

The coating in Examples 1 to 7 are made using glassy polymers with an overlay of the rubbery polymer or a rubbery polymer with an overlay of glassy polymers, in any combination, depending on the number of total layers desired.

Example 10 to Example 14

A glassy polymer solution is made in an appropriate solvent (Example 10), solvent mixture (Example 11), solvent/nonsolvent mixture (Example 12), solvent/poreformer mixer (Example 13) or solvent/nonsolvent/poreformer mixer (Example 14) in a polymer concentration from 0.5% to 50% polymer depending on the nature of the polymer, solvent, nonsolvent and poreformer used in a given solution. The solution is coated in the vessel and the appurtenances as in Example 1 and the solvent is evaporated. The resulting coating may have a microporous network. The coating is dried and the pores are filled with a 0.01-100% w/w solution of the odorant by contacting that solution with the microporous coating. The odorant material is drawn in the pores either by sorption or by capillary suction. Alternatively, the odorant material is sorbed in the microporous coating by sorption of the vapors of the odorant material. In all cases, once the odorant is sorbed by the microporous coating, the coating is encapsulated by making a semi-permeable coating on top of it as in Example 1.

Examples 15 to Example 19

In the coating solution in Examples 10-14, 0.01-50% of the odorant material in relation to the weight of the coating polymer is added to the coating solution. The resulting microporous coatings contain the odorants in its bulk. In all cases, once the odorant is sorbed by the microporous coating, the coating is encapsulated by making a semi-permeable coating on top of it as in Example 1.

Example 20 to Example 24

A dense coating is laid on the vessel surface prior to laying a microporous coating as in Examples 10-14. This is accomplished by making a 0.01-50% solution of a glassy or rubbery polymer in an appropriate solvent or solvent mixture and contacting with the appropriate surfaces and evaporating the solvents to leave a thin dense polymer film on the said surfaces. The coatings discussed in Examples 15 to 19 are then formed over it.

Example 25 to Example 29

In Examples 20-24, in addition to a dense coating on the vessel surface, an additional dense coating is laid on the surface exposed to the gas as well. This is done by making a 0.01-50% solution of a glassy or rubbery polymer in an appropriate solvent or solvent mixture and contacting with the appropriate surfaces and evaporating the solvents to leave a thin dense polymer film on the said surfaces.

Example 30

A glassy polymer, such as polysulfone, polyimide, polyetherketone, polycarbonate, polyamide, polyarylate, etc., is made in a 0.01-50% w/w solution in a solvent, solvent mixture or solvent mixture containing pore formers at appropriate concentrations and is coated on the vessel surfaces. The coating is then coagulated in an appropriate coagulant solution, preferably water or water containing minor amounts of solvents, non-solvents or surfactants. The coagulation is done at a temperature from 1 degree Celsius to 80 degrees Celsius depending on the nature of the pore structure desired for the coating. After coagulation, the coating is either dried by use of heat and forced convection or goes through a solvent exchange in order to minimize the pore collapse. The dried coating is then exposed with the odoriferous materials either in their solution or in the vapors formed to impregnate the dried coating with the odiferous materials.

Example 31

In Example 30, an additional dense layer is placed on top of the asymmetric coating containing the odorant materials formed as in Example 1.

Example 32

A dense layer of polymer is laid on the surface of the vessel prior to laying the asymmetric film of Example 31.

Example 33 to Examples 64

Coatings performed in Examples 1 to 32 are done on the exterior surface of the gas storage vessel and the appurtenances.

Examples 65 to 96

Coatings are performed on the surfaces of the gas storage vessel and appurtenances on both sides of the vessel, surfaces exposed to the gas as in Examples 1 to 31, and on the surfaces away from the gas as in Examples 33 to 64.

Examples 97 to 192

The liquid odorants can be immobilized on the solid sorbents such as clays, zeolites, cellulosic materials (e.g., saw dust), polymer powder, and the like. To do this, a solution of 0.01-100% w/w of the odorant in an appropriate aqueous or nonaqueous solvent is mixed with the sorbents and the solvent is removed by volitilization by heat or forced by air or inert gas circulation. The immobilized odorant is used in Examples 1 to 96 for the formation of the encapsulated odorant coatings.

While various embodiments of the invention have been described in detail with reference to the drawings and the specific examples above, it will be apparent to one skilled in the art that various changes and modifications can be made to those embodiments, drawings, and examples without departing from the spirit and scope of the invention as defined in the claims which follow.

The invention claimed is:

1. A method for detecting a gas leak from a pressurized gas storage vessel comprising
    (a) providing a pressurized gas storage vessel comprising a vessel capable of containing a pressurized gas, wherein the vessel includes a wall, a layer of odorant material, a layer of semi-permeable material, and a pressurized gas;
    (b) causing a leak in the wall of the vessel wherein gas stored in the vessel flows from an inner side of the wall to an outer side of the wall and carries odorant material;
    (c) releasing a mixture of the gas and odorant material into the atmosphere surrounding the pressurized gas storage vessel; and
    (d) detecting the smell of the odorant material in the atmosphere surrounding the pressurized gas storage vessel.

2. The method of claim 1 wherein the pressurized gas is hydrogen.

3. The method of claim 1 wherein the odorant material is selected from a group consisting of tert-butyl mercaptan, isopropyl mercaptan, normal propyl mercaptan, secondary butyl mercaptans, ethyl mercaptans, normal butyl mercaptan, tetrahydrothiophene, dimethyl sulfide, methyl ethyl sulfide, and combinations thereof, derivatives of acrylic acid, alkyl ethers of $C_4$-$C_7$, carboxylic acids, and combinations thereof.

4. The method of claim 1 wherein the semi-permeable material is selected from a group consisting of a rubbery polymer, a glassy polymer, and combinations thereof.

5. The method of claim 4 wherein the rubbery polymer is selected from a group consisting of polydimethyl siloxanes, polyphosphazenes, and combinations thereof.

6. The method of claim 4 wherein the glassy polymer is selected from a group consisting of polyimides, polysulfones, polyamides, polyarylates, polyolefins, polyetherketones, polycarbonates, and combinations thereof.

7. The method of claim 1 comprising one or more additional layers of semi-permeable material on any layer of the semi-permeable material in (a)(3).

8. The method of claim 1 comprising a first layer of semipermeable material in contact with the inner side of the wall of the vessel, the layer of odorant material in contact with the first layer of semipermeable material, and a second layer of semipermeable material in contact with the layer of odorant material and in contact with the gas in the vessel, wherein the odorant material is sandwiched between the two layers of semipermeable material.

9. A method of making a pressurized gas storage vessel comprising
    (a) providing a vessel capable of containing a pressurized gas, wherein the vessel has an inner side and an outer side;
    (b) applying a layer of odorant material adjacent the inner side, or a layer of odorant material adjacent the outer side, or a layer of odorant material adjacent the inner side and a layer of odorant material adjacent the outer side;
    (c) applying a layer of semi-permeable material adjacent any layer of odorant material so that the layer of odorant material is disposed between a layer of semi-permeable material and any side of the vessel; and
    (d) filling the vessel with a pressurized gas.

10. The method of claim 9 wherein the pressurized gas is hydrogen.

11. The method of claim 9 wherein the odorant material is selected from a group consisting of tert-butyl mercaptan, isopropyl mercaptan, normal propyl mercaptan, secondary butyl mercaptans, ethyl mercaptans, normal butyl mercaptan, tetrahydrothiophene, dimethyl sulfide, methyl ethyl sulfide, and combinations thereof, derivatives of acrylic acid, alkyl ethers of $C_4$-$C_7$, carboxylic acids, and combinations thereof.

12. The method of claim 9 wherein the semi-permeable material is selected from a group consisting of a rubbery polymer, a glassy polymer, and combinations thereof.

13. The method of claim 12 wherein the rubbery polymer is selected from a group consisting of polydimethyl siloxanes, polyphosphazenes, and combinations thereof.

14. The method of claim 12 wherein the glassy polymer is selected from a group consisting of polyimides, polysulfones, polyamides, polyarylates, polyolefins, polyetherketones, polycarbonates, and combinations thereof.

15. The method of claim 9 comprising applying one or more additional layers of semi-permeable material on any layer of semi-permeable material in (c).

16. The method of claim 9 comprising a first layer of semipermeable material in contact with the inner side of the wall of the vessel, the layer of odorant material in contact with the first layer of semipermeable material, and a second layer of semipermeable material in contact with the layer of odorant material and in contact with the gas in the vessel, wherein the odorant material is sandwiched between the two layers of semipermeable material.

* * * * *